(12) United States Patent
Ferretti et al.

(10) Patent No.: US 8,711,029 B2
(45) Date of Patent: Apr. 29, 2014

(54) PROCESS FOR FILTERING INTERFEROGRAMS OBTAINED FROM SAR IMAGES ACQUIRED ON THE SAME AREA

(75) Inventors: Alessandro Ferretti, Milan (IT); Alfio Fumagalli, Calco (IT); Fabrizio Novali, Milan (IT); Francesco De Zan, Gilching (DE); Alessio Rucci, Cassina De'Pecchi (IT); Stefano Tebaldini, Milan (IT)

(73) Assignees: Tele-Rilevamento Europa- T.R.E. S.R.L., Milan (IT); Politecnico di Milano, Milan (IT)

( * ) Notice: Subject to any disclaimer, the term of this patent is extended or adjusted under 35 U.S.C. 154(b) by 264 days.

(21) Appl. No.: 13/259,295

(22) PCT Filed: Jul. 2, 2010

(86) PCT No.: PCT/EP2010/059494
§ 371 (c)(1),
(2), (4) Date: Sep. 23, 2011

(87) PCT Pub. No.: WO2011/003836
PCT Pub. Date: Jan. 13, 2011

(65) Prior Publication Data
US 2012/0019410 A1    Jan. 26, 2012

(30) Foreign Application Priority Data
Jul. 8, 2009  (IT) .............................. MI09A001210

(51) Int. Cl.
*G01S 13/90*    (2006.01)
(52) U.S. Cl.
CPC ............. *G01S 13/90* (2013.01); *G01S 13/9035* (2013.01); *G06T 2207/10044* (2013.01)
USPC ....................................... 342/25 C; 342/25 F
(58) Field of Classification Search
CPC ................ G01S 13/90; G01S 13/9035; G06T 2207/10044

USPC ...................................... 342/25 R, 25 A–25 F
See application file for complete search history.

(56) References Cited

U.S. PATENT DOCUMENTS

| | | | | | |
|---|---|---|---|---|---|
| 5,488,374 | A | * | 1/1996 | Frankot et al. ............... | 342/25 C |
| 5,923,278 | A | * | 7/1999 | Poehler et al. ............... | 342/25 C |
| 6,011,505 | A | * | 1/2000 | Poehler et al. ............... | 342/25 C |
| 6,011,625 | A | * | 1/2000 | Glass ............................. | 356/496 |
| 6,046,695 | A | * | 4/2000 | Poehler et al. ............... | 342/25 A |
| 6,097,328 | A | * | 8/2000 | Frankot ......................... | 342/25 C |
| 6,583,751 | B1 | * | 6/2003 | Ferretti et al. ............... | 342/25 R |
| 6,677,885 | B1 | * | 1/2004 | Frankot ......................... | 342/25 R |
| 6,864,828 | B1 | * | 3/2005 | Golubiewski et al. ...... | 342/25 C |
| 8,570,209 | B2 | * | 10/2013 | Voelker ....................... | 342/25 A |
| 8,576,111 | B2 | * | 11/2013 | Smith et al. ................. | 342/25 F |
| 8,587,471 | B2 | * | 11/2013 | Ferretti et al. ............... | 342/25 R |
| 2004/0227659 | A1 | * | 11/2004 | Woodford et al. .......... | 342/25 R |
| 2005/0083225 | A1 | * | 4/2005 | Braubach et al. ........... | 342/25 C |
| 2010/0052977 | A1 | * | 3/2010 | Sathyendra .................. | 342/25 F |
| 2010/0214160 | A1 | * | 8/2010 | Smith et al. ................. | 342/25 F |
| 2012/0013501 | A1 | * | 1/2012 | Ferretti et al. ............... | 342/25 A |

FOREIGN PATENT DOCUMENTS

| | | | |
|---|---|---|---|
| EP | 1 183 551 B1 | 12/2003 | |
| EP | 1777550 A1 * | 4/2007 | ............. G01S 13/90 |
| EP | 2 017 647 A1 | 1/2009 | |
| EP | 2065731 A1 * | 6/2009 | ............. G01S 13/90 |
| EP | 2189810 A1 * | 5/2010 | |
| FR | 2935077 A1 * | 2/2010 | |
| WO | 2005/008281 | 1/2005 | |

OTHER PUBLICATIONS

International Search Report and Written Opinion of the International Searching Authority issued Aug. 24, 2010 in corresponding International Application No. PCT/EP2010/059494.

D. Perissin et al., "Repeat-Pass SAR Interferometry With Partially Coherent Targets", Proceedings of Fringe 2007, ESRIN, Frascati, Italy (IN: ESA-SP), ESA, European Space Agency, [Online], No. 649, Nov. 26, 2007, p. 7PP, XP007911824, ISBN: 978-92-9291-213-0, Retrieved from the Internet: URL:http://home.dei.polimi.it/perissin/Publish/07FringePartCoher.pdf>.

Alessandro Ferretti et al., "Moving from PS to Slowly Decorrelating Targets: A Prospective View", EUSAR 2008: Proceedings of the 7th European Conference on Synthetic Aperture Radar, Friedrichshafen, Germany, Jun. 2, 2008, p. 3PP, XP007911823, ISBN: 978-3-8007-3084-1.

F. De Zan et al., "PS Processing With Decorrelating Targets", Proceedings ENVISAT Symposium, Apr. 27, 2007, XP002569852.

* cited by examiner

*Primary Examiner* — John B Sotomayor
(74) *Attorney, Agent, or Firm* — Wenderoth, Lind & Ponack, L.L.P.

(57) ABSTRACT

A process for filtering interferograms obtained from SAR images, acquired on the same area by synthetic aperture radars, comprising the following steps: a) acquiring a series of N radar images (A1 . . . AN) by means of a SAR sensor on a same area with acquisition geometries such as to allow re-sampling of the data on a common grid; b) after re-sampling on a common grid, selecting a pixel from the common grid; c) calculating the coherence matrix of the selected pixel, that is estimating the complex coherence values for each possible pair of available images; d) maximizing, with respect of the source vector θ, here an unknown element, the functional: (formula) being R the operator which extracts the real part of a complex number, $\gamma_{nm}$ the modulus of the element (n,m), k a positive real number, $\phi_{nm}$ the phase of the element (n,m) of the coherence matrix, θn and θm the elements n and m of the unknown vector θ. Given that only phase differences appear in the functional T, the values of the unknown factor are estimated less an additive constant, which can be fixed by setting for example $\theta_1 = 0$, and the phase values $\theta_n$ thus obtained constitute the vector of the filtered phase values.

Figure 1:
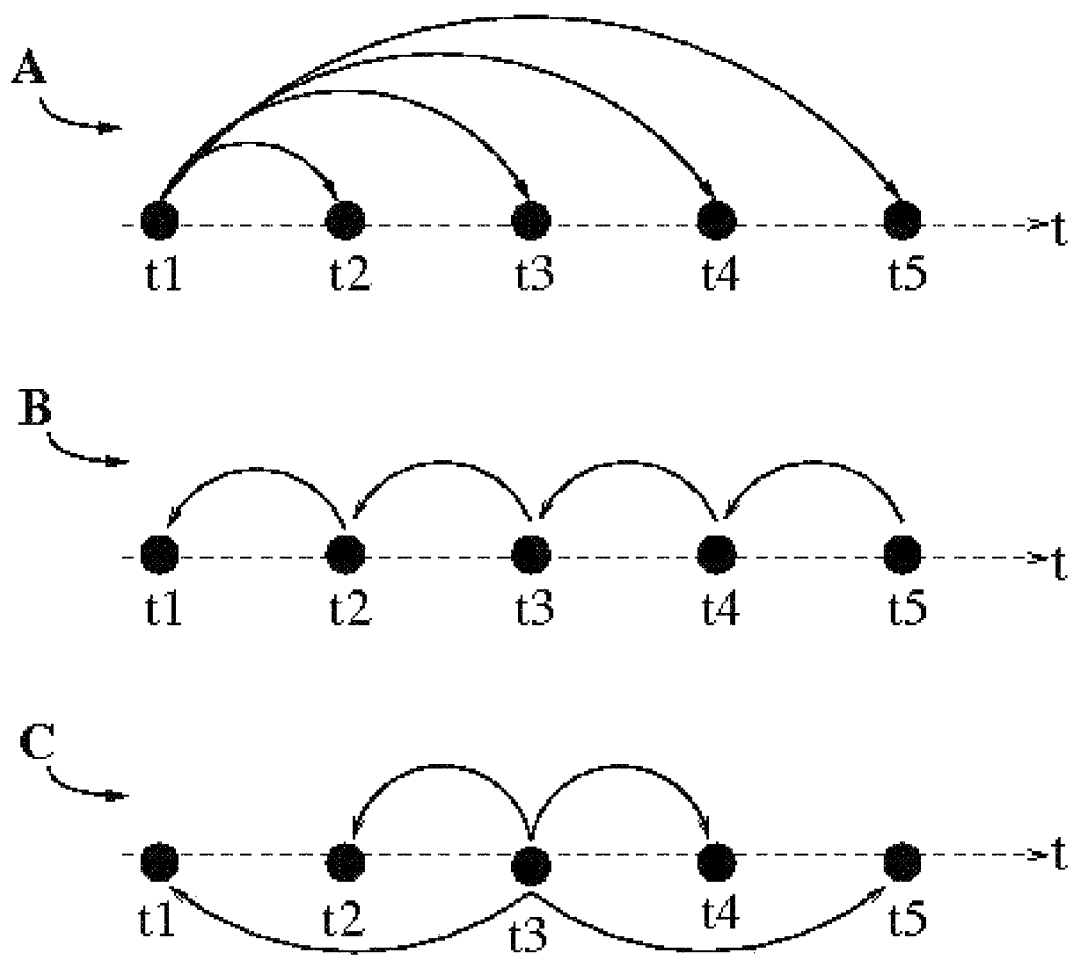

$$T = \Re \left\{ \sum_{n=1}^{N} \sum_{m=1}^{N} \gamma_{nm}^{k} \cdot e^{i\phi_{nm}} e^{-i(\theta_n - \theta_m)} \right\} \quad (I)$$

14 Claims, 7 Drawing Sheets

PROCESS FOR FILTERING INTERFEROGRAMS OBTAINED FROM SAR IMAGES ACQUIRED ON THE SAME AREA

The present invention relates to a process for filtering interferograms obtained from SAR images, acquired on the same area.

As is well known, a synthetic aperture radar or SAR system produces a two-dimensional image. One dimension of the image is called range and it is a measurement of the distance in line of sight from the radar to the object being illuminated. The other dimension is called azimuth and it is perpendicular to the "range".

SAR type radar operates at a frequency generally between 400 Mhz and 10 Ghz and is usually installed in aircrafts or on satellite platforms orbiting at an altitude of between 250 and 800 Km. The radar antenna is aimed at the ground orthogonally to the direction of motion of the platform (aircraft or satellite) with an off-nadir angle of between 20 and 80 degrees relative to the nadir direction, that is, perpendicularly to the ground.

With said system it is possible to obtain images of the earth's surface with a spatial resolution of a few metres, by synthesising (hence the name of the sensor), in the azimuth direction, an antenna of much larger dimensions than the actual ones by using suitable algorithms well known in the literature.

The most important characteristic of the SAR is that the sensor is of the coherent type and thus the images are matrixes of complex numbers in which the amplitude values are tied to the backscattered power from the illuminated objects (that is, to their radar cross section), whereas the phase is determined by the nature of the target and its distance from the radar. Associated with each pixel of a radar image I, identified by a certain range coordinate r and azimuth coordinate a, there is thus a complex number:

$$I(r,a) = x + i \cdot y = A \cdot e^{i\psi}$$

where x and y identify the real and imaginary part of the number, A its amplitude and $\psi$ the phase value, and i is the imaginary unit, or square root of $-1$.

Given the possibility of obtaining images irrespective of sunlight and cloud cover conditions, SAR imaging lends itself to a variety of applications; among these, of primary importance are applications tied to the identification and classification of targets and change detection and interferometric applications. The latter are usually aimed at obtaining digital elevation models and/or analyzing surface deformations of the ground based on multi-temporal SAR datasets.

Given two generic SAR images, identified as $I_n$ and $I_m$, acquired on a same area of interest and re-sampled on a common grid, an interferogram $\Phi_{nm}$ is defined as the result of the complex multiplication of one image by the complex conjugate value of the second:

$$\Phi_{nm} = I_n \cdot I_m^* = A_n \cdot e^{i\psi_n} \cdot A_m e^{-i\psi_m} = A_n A_m e^{i(\psi_n - \psi_m)}$$

where I* indicates the image in which the complex values have been transformed into the complex conjugate values by changing the sign of the phase values. It thus follows that the phase of the interferogram, also called interferometric phase, is given by the difference between the phases of the two images.

The phase of each pixel of a SAR image (identified by a certain range coordinate r and azimuth coordinate a) can be seen as the sum of a contribution $\xi$ linked to the nature of the illuminated object, called "reflectivity phase", and a contribution d linked to the optical path of the electromagnetic wave and thus to the characteristics of the transmission means and the sensor-target distance:

$$\psi(r,a) = \xi(r,a) + d(r,a)$$

If the electromagnetic characteristics of the object remain unchanged over time, there will be no variations in the term linked to the reflectivity phase ($\xi$), so that any phase variations that are revealed considering a number of acquisitions will be linked to possible variations in the optical path.

Of particular interest are applications leading to the reconstruction of historical series of movement, i.e. the capability of monitoring, over time, any movements of an object on the ground whose reflectivity remains unchanged and where it is possible to separate the phase contributions due to the transmission means.

Operatively, given a series of N SAR imagines acquired on a same area at different times, but re-sampled on a common grid, one wishes to calculate, for every pixel of the image, a historical series of N phase values (i.e. a value for every acquisition effected on the area of interest), on which to apply suitable algorithms for estimating any movements of the radar target along the direction identified by the sensor-target line of sight.

The quality of the estimate largely depends on the fact that the reflectivity phase of a certain resolution cell remains constant over time. If this hypothesis is verified, by calculating the differences of the phase values of the various acquisitions with respect, for example, to the first image, it is possible to bring to light the contributions due solely to variations in the optical path. It should be noted, therefore, that only the difference between the phase values of two acquisitions provides information and not the phase of a single image, given that the reflectivity phase values are unknown and vary from pixel to pixel: it is thus the interferometric phase that allows the map of any surface deformations to be visualized.

The reflectivity values of a real radar scene are not usually constant in all the available acquisitions, except for a limited number of objects, called permanent scatterers, on which it is possible to apply specific algorithms (European patent EP-1183551, Italian patent application MO2007A000363 dated 27.11.2007).

However, there are many other image pixels where information related to the optical path (i.e. signal of interest) can be extracted only on some interferograms or, more generally speaking, the signal-to-noise ratio varies significantly depending on the pair of images considered. This means that the hypothesis of invariance of the reflectivity phase term ($\xi$) can be only partly satisfied.

There are two main mechanisms leading to a variation in the reflectivity phase values: (a) temporal decorrelation, i.e. the variations in the electromagnetic characteristics of an object over time; (b) geometric or spatial decorrelation, induced by variations in the acquisition geometry. The first mechanism is dependent on the so-called "temporal baseline" of the interferogram, or, in the case of a set of images acquired at different times, the temporal distance between the two images used to generate the interferogram. The second mechanism depends instead on the so-called "geometric baseline", i.e. the distance between the trajectories followed by the sensor during the two acquisitions.

For the purpose of measuring the signal-to-noise ratio (i.e. quality) of the interferogram generated from the generic images n and m, it is common practice to use a parameter known in the literature by the name of interferometric coherence $\rho_{nm}$, or more simply coherence, which varies, in general, from pixel to pixel:

$$\rho_{nm} = \frac{E(I_n \cdot I_m^*)}{\sqrt{E(I_n \cdot I_n^*) \cdot E(I_m \cdot I_m^*)}}$$

where E(.) indicates the statistical operator known as "expectation". Operatively, the expectation operator is replaced by a spatial average computed on an appropriate window F centred around the current pixel. When selecting the estimation window, it will be necessary to select, to the extent possible, a statistically homogeneous population of samples in order to obtain reliable statistical estimates and the number of pixels used in the estimation may therefore vary from pixel to pixel (patent application n. MI2009A000535 dated 3.4.2009). The estimated coherence ($c_{nm}$) is thus calculated as follows:

$$c_{nm} = \gamma_{nm} \cdot e^{i\phi_{nm}} = \frac{\sum_{p \in F} x_n(p) x_m^*(p)}{\sqrt{\sum_{p \in F} |x_n(p)|^2 \sum_{p \in F} |x_m(p)|^2}}$$

having indicated with $\gamma_{nm}$, the estimated coherence modulus $c_{nm}$, with $\phi_{nm}$ its phase and with x(p) the p-th element of the estimation window F. The coherence thus computed is a complex number which varies from image pixel to pixel, whose modulus, in virtue of normalization, ranges between 0 and 1 (respectively minimum and maximum correlation, i.e. null or infinite signal-to-noise ratio) and whose phase is the average of the pixel phases used in the estimation window.

Given N SAR images re-sampled on a common grid, the coherence $c_{nm}$ can be seen as element of a matrix N×N, called coherence matrix, which is able to describe, for each pixel of the acquired scene, the interferometric quality of the entire set of available SAR images. That is, given a set of N SAR images acquired on the same area and for which the re-sampling of data on a common grid is possible, with each pixel it is possible to associate a matrix of N×N elements, where the generic element $c_{nm}$ is the estimate of the complex coherence between the images n and m of the set of available images.

Associated with the so-called permanent scatterers there is a coherence matrix whose modulus values will tend to be constant and close to one, indicating the high signal-to-noise ratio typical of this type of target, which remains high for each interferometric pair considered. As mentioned previously, however, permanent scatterers are only a minority of the pixels of a real scene. The vast majority of pixels, being influenced by decorrelation phenomena, are characterized by a coherence matrix whose amplitudes may prove to be extremely variable. In other words, the signal-to-noise ratio for the same pixel varies significantly from image to image and thus from interferogram to interferogram.

The extraction of a historical series with respect to the optical paths of a generic pixel is not a particularly difficult operation in the case of permanent scatterers: for them it is possible to generate N−1 interferograms all containing a same scene, for example the first one, and having a signal-to-noise ratio that is sufficiently high to ensure the application of successive algorithms to estimate the target's motion.

Let us consider, by way of example, a set of 5 SAR images re-sampled on a common grid, and acquired at different times ($t_1 \ldots t_5$), which one intends to use to reconstruct the historical series of the optical paths of a generic pixel, starting from $t_1$, the time of the first acquisition (FIG. 1). If the selected pixel is a permanent scatterer, one will proceed simply to obtain the four interferograms ($t_2, t_1$), ($t_3, t_1$), ($t_4, t_1$) and ($t_5, t_1$), which allow an estimation of the optical paths of the target (associated with the current pixel) with respect to the reference time $t_1$ (FIG. 1, diagram A). In general, where it is desired to create a historical series of N elements, the first value (corresponding to time $t_1$) will be set equal to zero.

The situation is very different in cases where the selected pixel is not a permanent scatterer and thus does not show acceptable levels of coherence on one or more of the interferograms considered in the previous paragraph. A first solution might be to proceed by trial and error in order to find interferometric pairs of good quality which allow a reconstruction of the complete historical series of the optical path values and combine the results obtained in the various interferograms (diagrams B and C in FIG. 1 show, by way of example, two configurations of N−1 interferograms which are different from what is shown in diagram A, but allow a historical series of N values to be obtained). However, it is reasonable to assume that such an operation will be more efficient if based on an analysis of the coherence matrix associated with the pixel in question, which, by construction, gives a synoptic picture of all possible interferometric pairs of the dataset.

It should be noted at this point that the elements of a generic coherence matrix not only allow an estimation of the signal-to-noise ratios of the interferograms by exploiting the moduli of the matrix values, but also offer, using the phase values, filtered versions of the interferometric phase values for each possible pair of images. As may be inferred from the definition of coherence stated in the previous paragraphs, the phase $\phi_{nm}$ of a generic element of the coherence matrix is given by a spatial average, computed on an appropriate estimation window F, of the interferometric phase values: this operation allows a significant reduction in the noise level, at least in the case of a homogeneous statistical population characterized by the same optical path value and for an interferogram with a non-null signal-to-noise ratio. Though on the one hand this averaging process allows noise levels to be reduced, on the other hand it means that the triangularity relationship will not be satisfied:

$$\phi_{nm} \neq \angle (e^{i\phi_{n1}} e^{i\phi_{1m}})$$

that is, in general, the phases are not consistent (for example, it is no longer true, as in the case of permanent reflectors, that $\phi_{21}$ and $\phi_{32}$ added together give $\phi_{31}$). Reconstructing a historical series of N phase values, where the contribution due to the reflectivity phase is best compensated for and hence the signal-to-noise ratio is maximized, thus requires the development of a suitable algorithm.

The problem may therefore be summed up as follows: given the coherence matrix relative to a generic image pixel, one wishes to derive a vector of N phase values $\theta = \{\theta_1 \ldots \theta_N\}$ which takes into account, in a suitable manner, all the available data, i.e. the filtered phase values associated with all the possible interferograms (in a number of N(N−1)/2) and their quality. The present invention proposes a method for obtaining this vector.

For the purpose of achieving this objective, the process according to the present invention provides for the following steps:

a) acquiring a series of N radar images (Al . . . AN) by means of a SAR sensor on a same area with acquisition geometries such as to allow re-sampling of the data on a common grid;
b) after re-sampling on a common grid, selecting a pixel from the common grid;
c) calculating the coherence matrix of the selected pixel, that is estimating the complex coherence values for each possible pair of available images;
d) maximizing, with respect of the source vector θ, here an unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real part of a complex number, $\gamma_{nm}$ the modulus of the element (n,m) of the coherence matrix, k a positive real number, $\phi_{nm}$ the phase of the element (n,m) of the coherence matrix, $\theta_n$ and $\theta_m$ the elements n and m of the unknown vector θ.

Given that only phase differences appear in the functional, the values of the unknown vector will be estimated less an additive constant, which can be fixed by setting, for example, $\theta_1=0$. The phase values $\theta_n$ thus obtained constitute the vector of the filtered phase values.

The choice of the exponent k to which to raise the coherence moduli depends on how one intends to weigh the phase values and on the possible polarization of the estimated coherence values. Operatively, good results have been obtained setting it equal to 1 or 2. It is important to point out that an excellent starting point for maximizing the functional (irrespective of the value of k) is the vector of the phase values of the autovector associated with dominant autovalue relative to the coherence matrix.

It should be noted that the proposed optimization, despite being based on a strongly non-linear functional, does not require an inversion of the coherence matrix; this is an element of considerable operative importance, given that coherence matrixes are often ill-conditioned. It should further be noted that the functional proposed is in actual fact a weighted sum, where the weights are linked to the moduli of the coherence matrix: it will thus be desired to place emphasis on the phase terms characterized by a high signal-to-noise ratio: the vector θ thus obtained will have elements that must respect to a greater degree the phases of the elements of the coherence matrix characterized by high coherence values, that is, greater values in terms of modulus.

It is important to note that once the vector θ is known for each pixel of the scene, it will be possible to replace the phase of the generic interferogram between the n-th image and the m-th image with the difference between the n-the and m-th vectors θ calculated for the various pixels of the image, thus creating a filtered version of the interferogram which—in actual fact—takes into account the whole dataset of available images.

The same type of approach can also be used for parametric estimates linked to the phase values: if the expected trend in such values is known a priori (for example, a polynomial law which is a function of the temporal baseline and geometric baseline of the various interferograms), said parameters can be estimated again using the proposed functional and optimizing no longer the phase values t, but directly the unknown parameters. This is the case when one wishes to estimate, for example, the average speed of movement and elevation of the radar target once the coherence matrix and the temporal and geometric baselines of the various interferograms are known.

Figure 2:
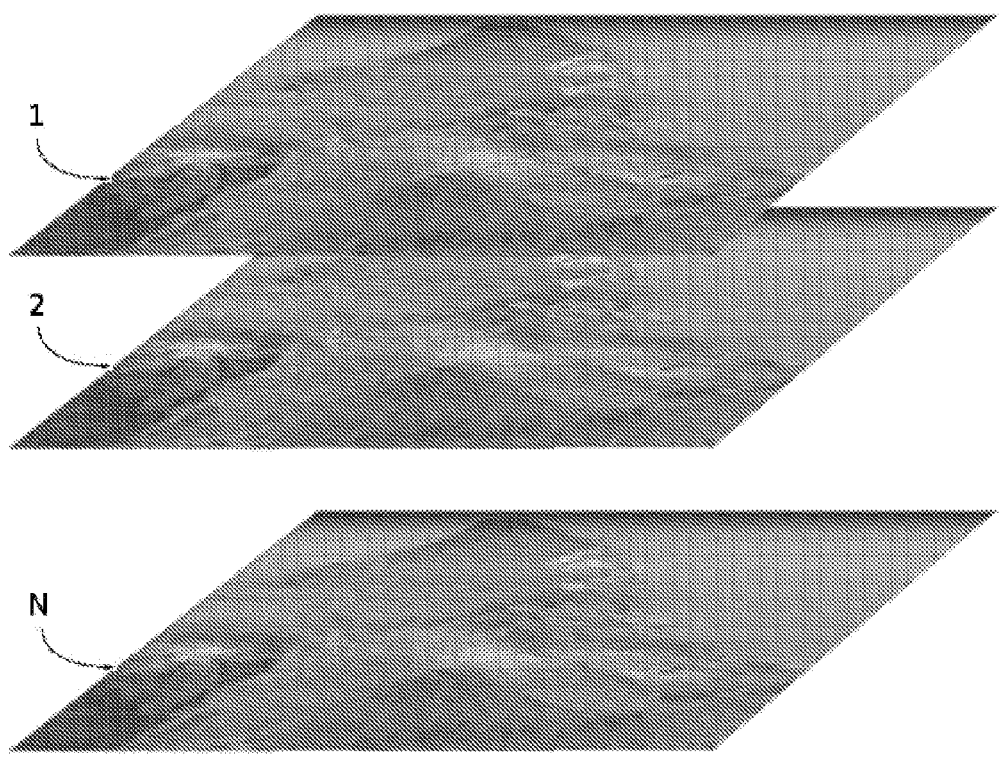
Figure 3:
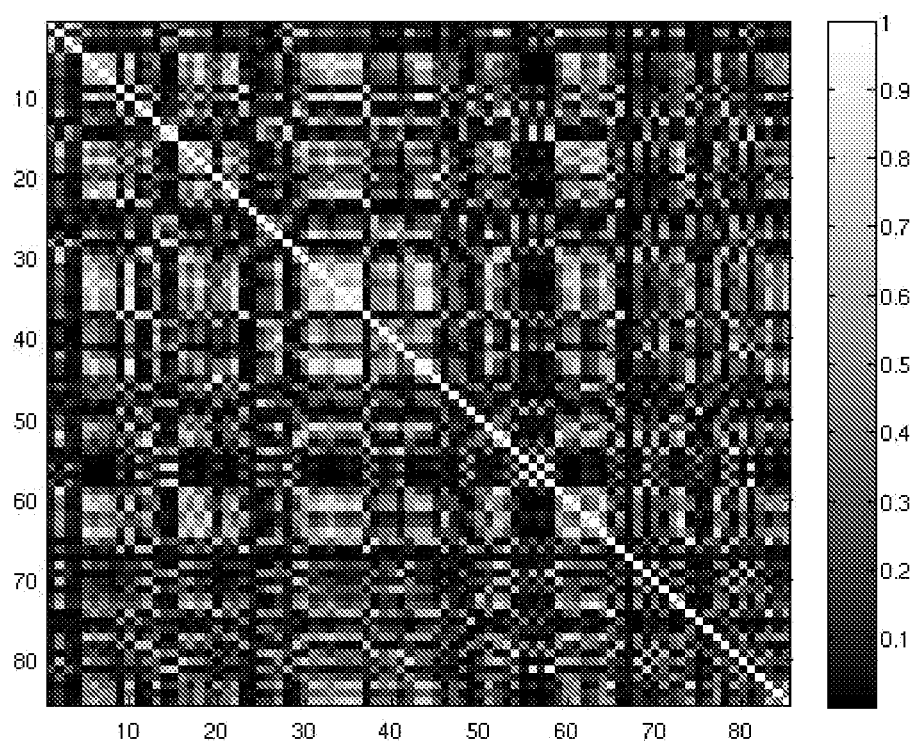
Figure 4:
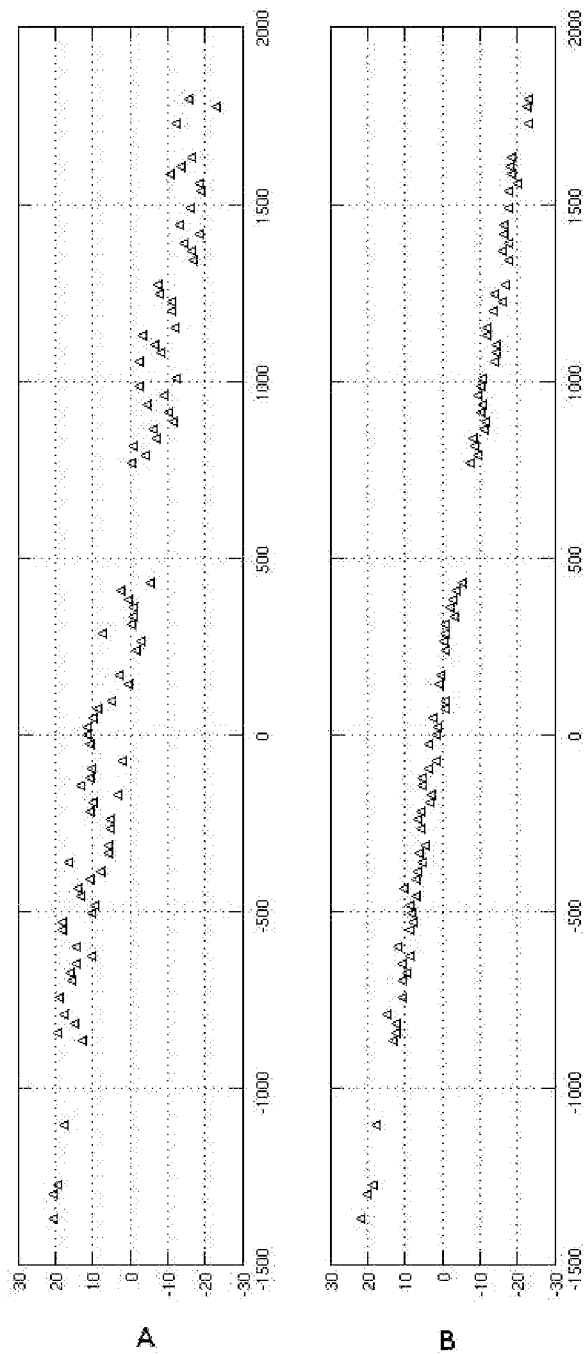

With the aim of showing what results can be obtained by means of the present invention, a set of 85 SAR images acquired by the RADARSAT satellite between 4 May 1999 and 5 Jan. 2008 while flying over the island of Hawaii, in the archipelago of the same name, were submitted to processing. After the images had been placed on a common grid (FIG. 2, which graphically shows that N images are available in relation to the area of interest and that homologous pixels in the various acquisitions correspond to the same ground resolution cell), the algorithm associated with the so-called permanent scatterers technique (patent EP-1183551) was applied to these images in order to extract time series of movement for the pixels of the scene. The same procedure was then repeated on the data obtained by applying the process of the invention on the original SAR images (setting k=2 in the functional to be optimized), that is, replacing the original phase values with those obtained from the various vectors θ. These were calculated, for every pixel of the image, downstream of the estimation of the coherence matrixes estimated as described in patent application MI2009A000535 dated 3.4.2009 and using a value of 1 as the exponent k of the functional T. By way of example, the amplitude values of a coherence matrix relative to a pixel in the area of interest are shown in FIG. 3 (it should be noted that the dimensions of the matrix correspond to the number N=85 of available images and that the values range from 0 to 1). FIG. 4 shows a comparison between the historical series of movement associated with a pixel in the case where the starting data are the unfiltered interferograms (historical series A) and in the case where the starting data are the interferograms reconstructed via the source vectors (low historical series B). The reduction in noise is evident. The temporal axis of the measurements (where time is measured in days) is shown along the x-axis of the diagrams and the estimated movements of the object on the ground, ranging between −30 and +30 mm, are shown on the y-axis.

Figure 5:
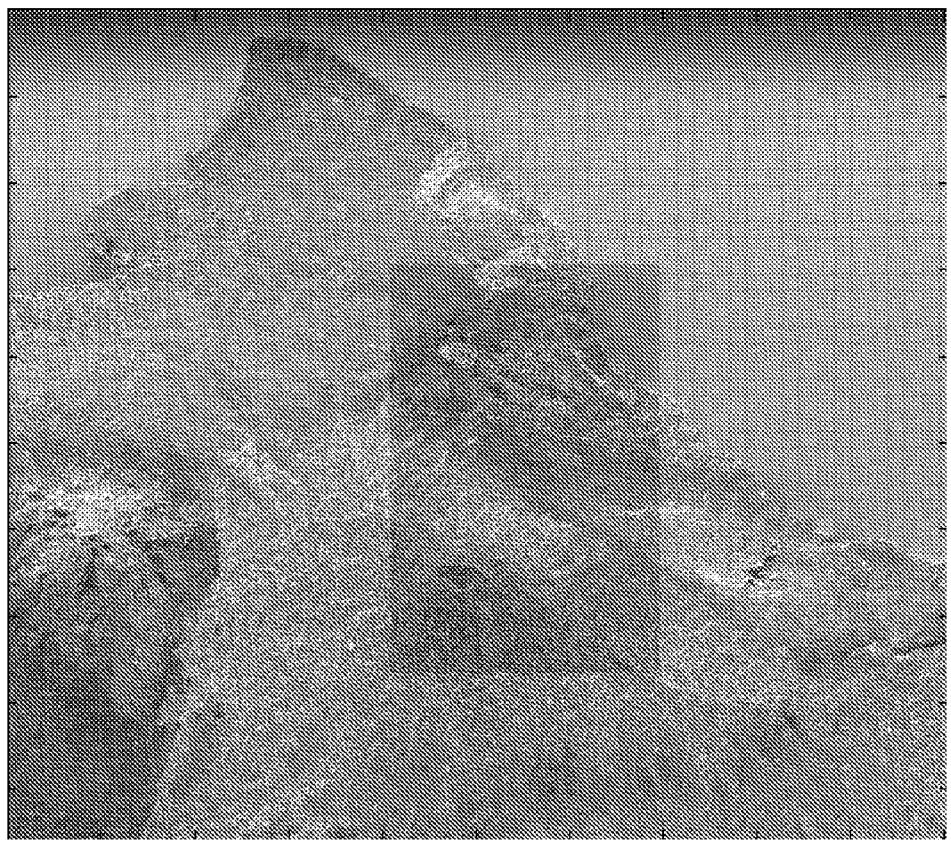
Figure 6:
Figure 7:
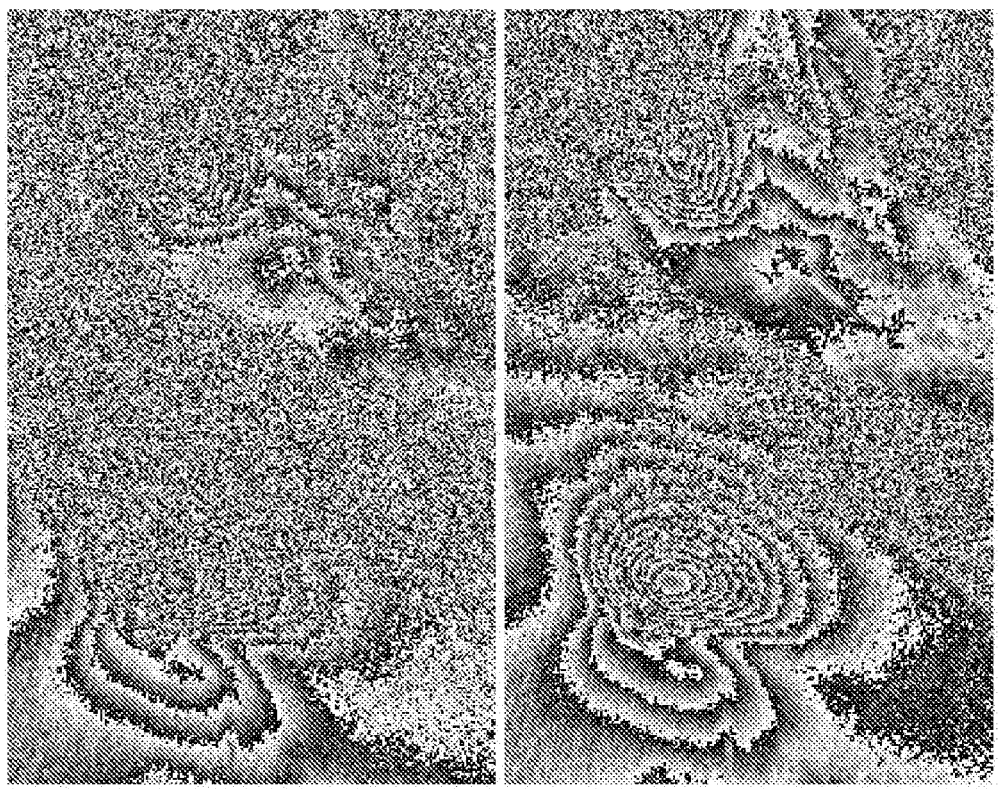

As a second example, solely to facilitate visualization of the figures, an area of the processed scene was cut out (highlighted in FIG. 5) in order to show two direct comparisons between the original interferograms and the ones reconstructed via the optimized phase vectors (FIGS. 6 and 7, in which the phase values of the interferograms are shown). In these interferograms, characterized by a high spatial baseline, some areas are characterized by low signal-to-noise ratios. In the figures, the part on the left shows the original interferograms and in the part on the right it is possible to appreciate the same interferograms reconstructed following the process of the present invention, and thus replacing the original interferometric phase with the phase difference of the elements of the vectors θ. Operatively, once the vector θ was obtained for every pixel of the scene, the phase of every pixel of the interferogram obtained between the n-th and the m-th image was replaced with the phase difference $\theta_n - \theta_m$ extracted from the vector θ associated with the current pixel. The effect is noteworthy: where noise was such as to preclude the discernment of interferometric fringes, the technique proposed here resulted in a drastic reduction, thus enabling the signal of interest to be clearly discerned.

The invention claimed is:

1. A process for filtering interferograms obtained from SAR images, acquired on the same area by synthetic aperture radars, the process comprising the following steps:
   a) acquiring a series of N radar images (Al . . . AN) by means of a SAR sensor on a same area with acquisition geometries such as to allow re-sampling of the data on common grid;

b) after re-sampling on common grid, selecting a pixel from the common grid;
c) calculating, using a microprocessor, the coherence matrix of the selected pixel, that is estimating the complex coherence values for each possible pair of available images;
d) maximizing, with respect of the source vector θ, here unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ the phase of the element (n,m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values.

2. The process according to claim 1, wherein the additive constant is fixed by setting $\theta_1 = 0$.

3. The process according to claim 1, wherein every element of the coherence matrix is evaluated by means of the equation:

$$c_{nm} = \gamma_{nm} \cdot e^{i\phi_{nm}} = \frac{\sum_{p \in F} x_n(p) x_m^*(p)}{\sqrt{\sum_{p \in F} |x_n(p)|^2 \sum_{p \in F} |x_m(p)|^2}}$$

having indicated with F a suitable estimation window around the selected pixel, x(p) the p-th element of the estimation window F, n and m the n-th and m-th images belonging to the set of N SAR images re-sampled on common grid.

4. The process according to claim 1, wherein the N elements of the source vector θ are linked by a polynomial relation, referable to the following form:

$$\theta_n = g(t_n, B_n)$$

being $t_n$ the acquisition time of the n-th image with respect to the first acquisition, $B_n$ the normal baseline of the n-th image still with respect to the first acquisition, the functional being maximized with respect to the coefficients of the polynomial g.

5. The process according to claim 1, wherein the N elements of the source vector θ are linked by a linear relation, referable to the following form:

$$\theta_n = C_v \cdot v \cdot t_n + C_h \cdot h \cdot B_n$$

being $C_v$ and $C_h$ known parameters depending on the acquisition geometry and on the utilized sensor, $t_n$ the acquisition time of the n-th image with respect to the first acquisition, $B_n$ the normal baseline of the n-th image still with respect to the first acquisition, in the optimization process, with also $t_n$ and $B_n$ known, being estimated only the values v and h, linked respectively to the average displacement speed and to the elevation of the object which occupies the selected pixel.

6. The process according to claim 1, wherein the N images acquired by means of a SAR are acquired at different times.

7. The process according to claim 1, wherein the N images acquired by means of a SAR are acquired with different sight angles.

8. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
a) acquiring a series of N radar images (A1 . . . AN) by means of a SAR sensor on a same area with acquisition geometries such as to allow re-sampling of the data on common grid;
b) after re-sampling on common grid, selecting a pixel from the common grid;
c) calculating the coherence matrix of the selected pixel, that is estimating the complex coherence values for each possible pair of available images;
d) maximizing, with respect of the source vector θ, here unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ the phase of the element (n,m) of the coherence matrix, $\theta_n$ and $\theta_m$ elements n and m of the unknown vector θ, the values of the unknown factor being estimated unless an additive constant and the phase values $\theta_n$ thus obtained constituting the vector of the filtered phase values.

9. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
a) acquiring a series of N radar images (A1 . . . AN) by means of a SAR sensor on a same area with acquisition geometries such as to allow re-sampling of the data on common grid;
b) after re-sampling on common grid, selecting a pixel from the common grid;
c) calculating the coherence matrix of the selected pixel, that is estimating the complex coherence values for each possible pair of available images;
d) maximizing, with respect of the source vector θ, here unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real s art of a complex number, $\gamma_{nm}$ the module of the element (n,m) of the coherence matrix, k a positive real number, $\phi_{nm}$ phase of the element (n m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values,
wherein the additive constant is fixed by setting $\theta_1 = 0$.

10. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
   a) acquiring a series of N radar images (A1 ... AN) by means of a SAR sensor on a same area with acquisition geometries such as to allow re-sampling of the data on common grid;
   b) after re-sampling on common grid, selecting a pixel from the common grid;
   c) calculating the coherence matrix of the selected pixel, that is estimating the complex coherence values for each possible pair of available images;
   d) maximizing, with respect of the source vector θ, here unknown element, the functional:

$$T = \Re\left\{\sum_{n=1}^{N}\sum_{m=1}^{N} \gamma_{nm}^k \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ phase of the element (n,m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values,
   wherein every element of the coherence matrix is evaluated by means of the equation:

$$c_{nm} = \gamma_{nm} \cdot e^{i\phi_{nm}} = \frac{\sum_{p \in F} x_n(p) x_m^*(p)}{\sqrt{\sum_{p \in F}|x_n(p)|^2 \sum_{p \in F}|x_m(p)|^2}}$$

having indicated with F a suitable estimation window around the selected pixel, x(p) the p-th element of the estimation window F, n and m the n-th and m-th images belonging to the set of N SAR images re-sampled on common grid.

11. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
   a) acquiring a series of N radar images (A1 ... AN) by means of a SAR sensor on a same area with acquisition geometries such as to allow re-sampling of the data on common grid;
   b) after re-sampling on common grid, selecting a pixel from the common grid;
   c) calculating the coherence matrix of the selected pixel, that is estimating the complex coherence values for each possible pair of available images;
   d) maximizing, with respect of the source vector θ, here unknown element, the functional:

$$T = \Re\left\{\sum_{n=1}^{N}\sum_{m=1}^{N} \gamma_{nm}^k \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ phase of the element (n,m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values,
   wherein the N elements of the source vector θ are linked by a polynomial relation, referable to the following form:

$$\theta_n = g(t_n, B_n)$$

being $t_n$ the acquisition time of the n-th image with respect to the first acquisition, $B_n$ the normal baseline of the n-th image still with respect to the first acquisition, the functional being maximized with respect to the coefficients of the polynomial g.

12. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
   a) acquiring a series of N radar images (A1 ... AN) by means of a SAR sensor on a same area with acquisition geometries such as to allow re-sampling of the data on common grid;
   b) after re-sampling on common grid, selecting a pixel from the common grid;
   c) calculating the coherence matrix of the selected pixel, that is estimating the complex coherence values for each possible pair of available images;
   d) maximizing, with respect of the source vector θ, here unknown element, the functional:

$$T = \Re\left\{\sum_{n=1}^{N}\sum_{m=1}^{N} \gamma_{nm}^k \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ the phase of the element (n,m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values,
   wherein the N elements of the source vector θ are linked by a linear relation, referable to the following form:

$$\theta_n = C_v \cdot v \cdot t_n + C_h \cdot h \cdot B_n$$

being $C_v$ and $C_h$ known parameters depending on the acquisition geometry and on the utilized sensor, $t_n$ the acquisition time of the n-th image with respect to the first acquisition, $B_n$ the normal baseline of the n-th image still with respect to the first acquisition, in the optimization process, with also $t_n$ and $B_n$ known, being estimated only the values v and h, linked respectively to the average displacement speed and to the elevation of the object which occupies the selected pixel.

13. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
   a) acquiring a series of N radar images (Al . . . AN) by means of a SAR sensor on a same area with acquisition geometries such as to allow re-sampling of the data on common grid;
   b) after re-sampling on common grid, selecting a pixel from the common grid;
   c) calculating the coherence matrix of the selected pixel, that is estimating the complex coherence values for each possible pair of available images;
   d) maximizing, with respect of the source vector θ, here unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real part of a complex number, $\gamma_{nm}$ the module of the element (n,m) of the coherence matrix, k a positive real number, $\phi_{nm}$ the phase of the element (n,m) of the coherence matrix, $\theta_n$ and $\theta_m$ the elements n and m of the unknown vector θ, the values of the unknown factor being estimated unless an additive constant and the phase values $\theta_n$ thus obtained constituting the vector of the filtered phase values,
   wherein the N images acquired by means of a SAR are acquired at different times.

14. A computer comprising a memory and a microprocessor suitable to exchange data with the memory, the memory including an applicative software which is installed in the memory and is running, and the software being suitable to implement a process for filtering interferograms obtained from SAR images, acquired on the same area by synthetic aperture radars, the process including the following steps:
   a) acquiring a series of N radar images (Al . . . AN) by means of a SAR sensor on a same area with acquisition geometries such as to allow re-sampling of the data on common grid;
   b) after re-sampling on common grid, selecting a pixel from the common grid;
   c) calculating the coherence matrix of the selected pixel, that is estimating the complex coherence values for each possible pair of available images;
   d) maximizing, with respect of the source vector θ, here unknown element, the functional:

$$T = \Re\left\{\sum_{n=1}^{N}\sum_{m=1}^{N} \gamma_{nm}^{k} \cdot e^{i\phi_{nm}} e^{-i(\theta_n - \theta_m)}\right\}$$

being $\Re$ the operator which extracts the real part of a complex number, γhd nm the module of the element (n,m) of the coherence matrix, k a positive real number, $\phi_{nm}$ the phase of the element (n m) of the coherence matrix, $\theta_n$ and $\theta_m$ elements n and m of the unknown vector θ, the values of the unknown factor being estimated unless an additive constant and the phase values $\theta_n$ thus obtained constituting the vector of the filtered phase values,
   wherein the N images acquired by means of a SAR are acquired with different sight angles.

* * * * *